United States Patent [19]

Keller et al.

[11] 3,828,240

[45] Aug. 6, 1974

[54] MONOLITHIC INTEGRABLE SERIES STABILIZATION CIRCUIT FOR GENERATING A CONSTANT LOW VOLTAGE OUTPUT

[75] Inventors: Hans Keller, Gundelfingen, Germany; Henry M. Kleinman, Boca Raton, Fla.

[73] Assignee: ITT Industries, Inc., New York, N.Y.

[22] Filed: June 26, 1973

[21] Appl. No.: 373,696

[52] U.S. Cl. ........................ 323/22 T, 323/1, 323/38

[51] Int. Cl. ................................................ G05f 1/58

[58] Field of Search ............ 307/297; 323/1, 16, 19, 323/22 T, 38, 68

[56] References Cited

UNITED STATES PATENTS

| | | | |
|---|---|---|---|
| 3,524,125 | 8/1970 | Berger et al. | 323/22 T |
| 3,612,984 | 10/1971 | Davis et al. | 323/22 T |
| 3,617,859 | 11/1971 | Dobkin et al. | 323/22 T |
| 3,628,127 | 12/1971 | Waldhauer | 323/22 T |
| 3,652,922 | 3/1972 | Healey et al. | 323/22 T |

*Primary Examiner*—A. D. Pellinen
*Attorney, Agent, or Firm*—John T. O'Halloran; Menotti J. Lombardi, Jr.; Vincent Ingrassia

[57] ABSTRACT

A series stabilization circuit for generating a regulated voltage in the order of one volt. In order to reduce variations in the output voltage due to changes in temperature, the reference voltage used is a combination of the outputs of two reference voltage sources. The first reference source has a negative coefficient of voltage such that its output will decrease when temperatures increase. The second reference source has a positive coefficient of voltage such that its output will increase as temperature increases thereby resulting in a balanced overall reference voltage.

4 Claims, 2 Drawing Figures

MONOLITHIC INTEGRABLE SERIES STABILIZATION CIRCUIT FOR GENERATING A CONSTANT LOW VOLTAGE OUTPUT

BACKGROUND OF THE INVENTION

This invention relates to a series stabilization circuit for generating regulated voltages in the order of one volt. In known circuits, the base-emitter threshold voltage of a comparison or reference transistor is used as a reference voltage, because components with a Zener characteristic are not available for voltages in the order of 1 volt.

In one type of known circuit both the main or series transistor and the reference transistor are complimentary while in another known circuit these two transistors are of the same conductivity type. Each of the two known circuits still comprises an auxiliary transistor which, in the case of the first known circuit, is of the same conductivity type as the reference transistor while, in the case of the second known circuit, this auxiliary transistor is complimentary to the main and the reference transistors.

In the first known circuit, this auxiliary transistor merely serves to effect the phase reversal in order to arrive at the intended control behavior. The auxiliary transistor according to the second known circuit, however, is intended to contribute towards enlarging the control sensitivity.

The aforementioned known circuits just like the circuit according to the invention are aimed at keeping constant the supply voltage of single dry cell batteries or accumulators, which gradually decreases during discharge of the batteries in battery-operated equipments, and also at safeguarding the interchangeability of the different commercially available types of single dry cell batteries or accumulators, because the rated voltages thereon are different. Since these batteries, however, mostly have a small energy content, with the entire current thereof, owing to the duration of the available operating time, being intended to be used exclusively for operating the equipment and its circuit, the series stabilization circuit may only draw an extremely small leakage current, i.e., this leakage current should range between 1 and 10 $\mu$ A. The above described circuits do not satisfy this requirement. To achieve a leakage current within the desired range, it is known to provide a constant current source which feeds the common connection point of the base of the reference amplifier transistor and the collector of the transistor acting as a reference potential source. The primary weakness of this arrangement is that the reference developed is not constant with temperature so that the stabilized output voltage varies with the temperature of the circuit.

SUMMARY OF THE INVENTION

It is an object of the present invention to provide a monolithic integrable series stabilization circuit which while consuming a leakage current ranging between 1 and 10 $\mu$ A, will yield a stabilized output voltage with respect to temperature.

According to a broad aspect of the invention there is provided a monolithic integrable series stabilization circuit for generating a stabilized constant amplitude output voltage in the order of one volt from a variable amplitude input voltage comprising a main transistor having an emitter base and collector, said emitter coupled to the input voltage and said collector coupled to the output voltage, a constant voltage transistor of conductivity type complimentary to said main transistor having an emitter base and collector, said emitter of said constant voltage transistor coupled to ground, and said base of said constant voltage transistor coupled to the collector of said constant voltage transistor, a dropping resistor coupled between said input voltage and the collector of said constant voltage transistor, an auxiliary transistor of the same conductivity type as said main transistor having an emitter, base and collector, said emitter coupled to the base of said main transistor and said collector coupled to ground, a voltage divider having a tapping point, said voltage divider having one end coupled to the output voltage, a first source of reference voltage coupled between ground and the other end of said voltage divider, said first source exhibiting a negative coefficient of voltage such that its output decreases as temperature decreases, a second source of reference voltage coupled between the base of said auxiliary transistor, the output voltage and the tapping point of said voltage divider, said second source having a positive coefficient of voltage such that its output increases as temperature increases and means coupled between said constant voltage transistor and said second source for supplying a constant current to said second source.

The above and other objects of the present invention will be better understood from the following detailed description taken in conjunction with the accompanying drawings in which:

DESCRIPTION OF THE PREFERRED EMBODIMENT

Figure 1:
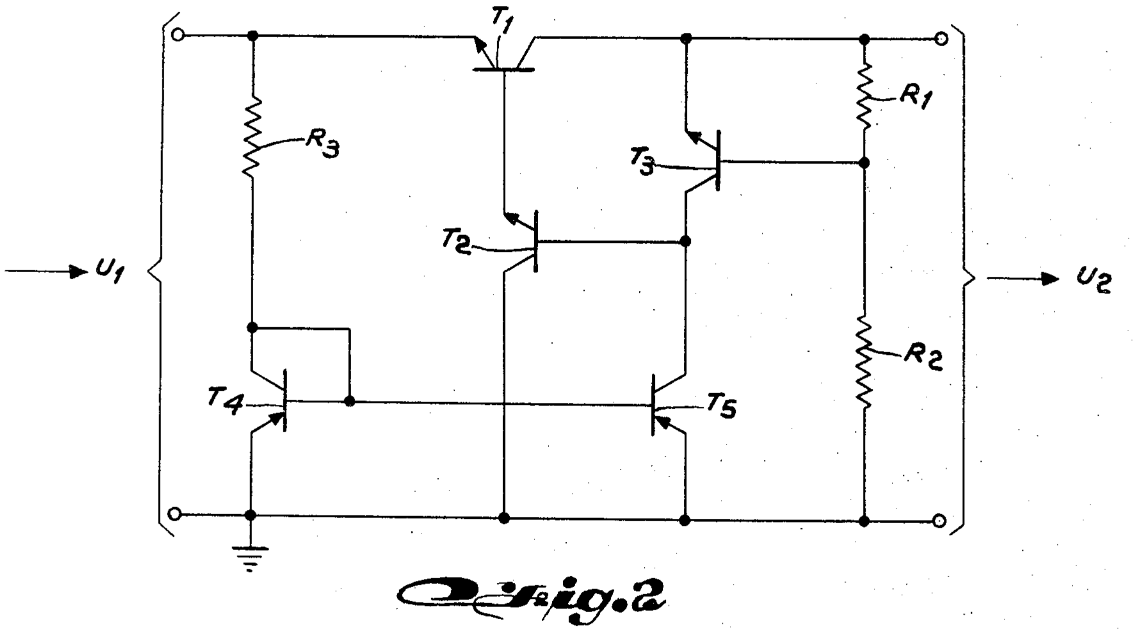
Fig. 1 (PRIOR ART)
FIG. 1 is a schematic diagram of a series stabilization circuit according to the prior art.

The prior art circuit of FIG. 1 shows a series stabilization circuit consisting of a main or series transistor $T_1$, with the emitter thereof being connected to the input voltage $U_1$, and with the collector thereof being connected to the stabilized output voltage $U_2$.

Between the stabilized output voltage $U_2$ and ground there is arranged the voltage divider consisting of voltage-dividing resistors $R_1$ and $R_2$. To the tapping point of this voltage divider constituted by the common connecting point of the two resistors, there is connected the base of reference transistor $T_3$. The emitter of the reference transistor $T_3$ is likewise connected to the stabilized output voltage $U_2$. In FIG. 1, the base-emitter threshold voltage of the reference transistor is used as a reference voltage for the stabilization circuit.

The collector of the reference transistor $T_3$ is connected to the base of auxiliary transistor $T_2$, with the collector thereof being connected to ground, and with the emitter thereof being connected to the base of the main transistor $T_1$.

It is recognized that a low quiescent current ranging between 1 and 10 $\mu$ A may be obtained when the common connecting point of the base of the auxiliary transistor $T_2$ and the collector of the reference transistor $T_3$ is fed with a constant current. The stabilizing effect of the circuit shown in FIG. 1 thus results from the fact that the reference transistor $T_3$ requires more constant current when the output voltage $U_2$ increases, so that less current is flowing in the auxiliary transistor $T_2$. This leads to an increase of the output resistance of the main transistor, thus compensating for the increase of the output voltage $U_2$.

Accordingly, the common connecting point of the base of the auxiliary transistor $T_2$ and the collector of the reference transistor $T_3$ is fed from the collector of a further transistor $T_5$ which operates as a constant current source and which is complimentary to the main, auxiliary, and reference transistors. The emitter of transistor $T_5$ is connected to ground while its base is connected to a constant voltage. For this purpose, there is provided a transistor $T_4$ which is connected as a diode, and which is also complimentary to the main, auxiliary, and reference transistors, i.e., transistors $T_4$ and $T_5$ are of the same conductivity type.

The emitter of constant voltage transistor $T_4$ which is connected as a diode, is coupled to ground while both the base and the collector thereof are connected to one another and, across a dropping resistor $R_3$, to the non-stabilized input voltage $U_1$.

In the case of a circuit monolithically integrated in accordance with known bipolar techniques, for stabilizing the output voltage to 1.1 V at an initial input voltage of 1.5 V (Manganese dioxide single dry cell battery) for a maximum current drain of 0.5 mA the three resistors in the circuit of FIG. 1 were realized by means of diffused semiconductor zones and have the following resistance values:

| | |
|---|---|
| $R_1$ and $R_2$ | 820 kilohms each |
| $R_3$ | 1 megohm |

In this circuit, across the dropping resistor $R_3$ and via transistor $T_4$, there flows a bias current of about 1 $\mu$ A. A current of the same value, flows through the collector-emitter path of constant current transistor $T_5$, with this current then dividing itself between the base-emitter path of auxiliary transistor $T_2$ and the collector-emitter path of reference transistor $T_3$. A current of somewhat less than 1 $\mu$ A flows across the voltage divider consisting of resistors $R_1$ and $R_2$. The base current of the main transistor which is dependent upon the current load of the series stabilization circuit, flows through the collector-emitter path of auxiliary transistor $T_2$.

Under no-load conditions, there will flow a quiescent current of not quite 3 $\mu$ A which, under current-load conditions, increases by an amount which is equal to the current-load divided by the current-gain factor when the main transistor $T_1$ is arranged in a grounded-emitter connection.

As stated above, the primary weakness of the circuit shown in FIG. 1 is that the reference voltage used is not constant with temperature so that the stabilized output voltage varies with the temperature of the circuit. Since reference transistor $T_3$ in FIG. 1 has a negative coefficient of voltage, the base-emitter voltage (reference voltage) will decrease as the temperature increases.

Figure 2:
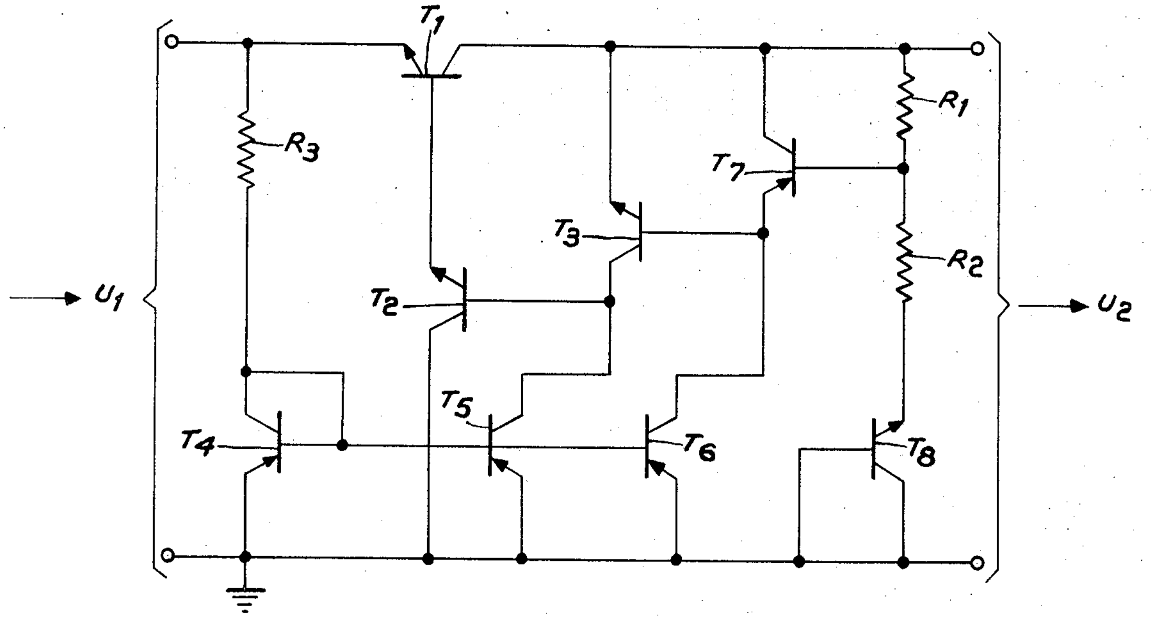
FIG. 2 is a schematic diagram of a series stabilization circuit according to the present invention.

The inventive circuit shown in FIG. 2 solves the temperature coefficient problem by replacing the single transistor $T_3$ with a reference voltage source having a positive coefficient of voltage, and balancing this with a reference having a negative coefficient of voltage.

FIG. 2 has essentially the same elements contained in FIG. 1 with the exception of additional transistors $T_6$, $T_7$ and $T_8$. Transistor $T_6$, having an emitter and base coupled respectively to the emitter and base of transistor $T_5$ operates in a similar fashion as transistor $T_5$ and provides a constant current to transistor $T_7$. As connected in FIG. 2, transistors $T_3$ and $T_7$ each have a negative coefficient of voltage. However, since the coefficient of voltage varies inversely with the base-emitter voltage, the difference between the base-emitter voltage of transistor $T_3$ and base-emitter voltage of transistor $T_7$ can be shown to have a positive coefficient of voltage. For instance, typically the base-emitter drop of transistor $T_3$ at room temperature is approximately 600 mv and the base-emitter voltage drop of transistor $T_7$ is 500 mv. If the temperature were to increase, the base-emitter voltage of transistor $T_3$ might drop to 550 mv while that of transistor $T_7$ would drop to 440 mv. Therefore, while the difference in base-emitter voltages at room temperature was 100 mv, the difference at an elevated temperature is now 110 mv. Since the difference in base-emitter voltages has increased, it may be said that the combination of transistors $T_3$ and $T_7$ exhibit a positive coefficient of voltage.

Additional transistor $T_8$ is inserted between ground and voltage divider resistor $R_2$, and is connected as a diode. This transistor exhibits a negative coefficient of voltage which balances the resulting positive coefficient developed in the combination of transistors $T_3$ and $T_7$. Thus, since the reference voltage is maintained relatively stable, the output voltage $U_2$ will also be maintained relatively stable. While the circuit shown in FIG. 2 has specific application to any miniature battery operated equipment such as watches, medical transducers, etc., it is also applicable to all series stabilization circuits in which power draining considerations are important.

It is to be understood that the foregoing description of specific examples of this invention is made by way of example only and is not to be considered as a limitation on its scope.

We claim:

1. A monolithic integrable series stabilization circuit for generating a stabilized constant amplitude output voltage in the order of one volt from a variable amplitude input voltage comprising:

a main transistor having an emitter base and collector, said emitter coupled to the input voltage and said collector coupled to the output voltage;

a constant voltage transistor of conductivity type complimentary to said main transistor having an emitter base and collector, said emitter of said constant voltage transistor coupled to ground, and said base of said constant voltage transistor coupled to the collector of said constant voltage transistor;

a dropping resistor coupled between said input voltage and the collector of said constant voltage transistor;

an auxiliary transistor of the same conductivity type as said main transistor having an emitter, base and collector, said emitter coupled to the base of said main transistor and said collector coupled to ground;

a voltage divider having a tapping point, said voltage divider having one end coupled to the output voltage;

a first source of reference voltage coupled between ground and the other end of said voltage divider, said first source exhibiting a negative coefficient of voltage such that its output decreases as temperature decreases;

a second source of reference voltage coupled between the base of said auxiliary transistor, the output voltage and the tapping point of said voltage divider, said second source having a positive coefficient of voltage such that its output increases as temperature increases; and means coupled between said constant voltage transistor and said second source for supplying a constant current to said second source.

2. A monolithic integrable series stabilization circuit according to claim 1 wherein said first reference source comprises a transistor of the same conductivity as that of said main transistor and having a base and collector coupled to ground and an emitter coupled to said other end of said voltage divider.

3. A monolithic integrable series stabilization circuit according to claim 1 wherein said means comprises:

a first transistor having a conductivity complimentary to that of said main transistor and having a base coupled to the base of said constant voltage transistor, an emitter coupled to ground and a collector coupled to said second source; and a second transistor having a conductivity complimentary to that of said main transistor and having a base coupled to the base of said constant voltage transistor, an emitter coupled to ground and a collector coupled to said second source.

4. A monolithic integrable series stabilization circuit according to claim 3 wherein said second reference source comprises:

a third transistor having the same conductivity as that of said main transistor and having an emitter coupled to the output voltage and a collector coupled to the base of said auxiliary transistor and to the collector of said first transistor; and a fourth transistor having a conductivity complimentary to that of said main transistor and having a base coupled to the tapping point of said voltage divider, a collector coupled to the output voltage and an emitter coupled to both the base of said third transistor and the collector of said second transistor.

* * * * *